June 30, 1964 T. GASSINO 3,139,520

PERFORATED RECORD CARD READING APPARATUS

Filed April 6, 1962 3 Sheets-Sheet 1

INVENTOR
TERESIO GASSINO
BY
Kenyon & Kenyon
ATTORNEYS

June 30, 1964 T. GASSINO 3,139,520

PERFORATED RECORD CARD READING APPARATUS

Filed April 6, 1962 3 Sheets-Sheet 2

INVENTOR
TERESIO GASSINO
BY Kenyon & Kenyon
ATTORNEYS

June 30, 1964 T. GASSINO 3,139,520

PERFORATED RECORD CARD READING APPARATUS

Filed April 6, 1962 3 Sheets-Sheet 3

INVENTOR
TERESIO GASSINO
BY
Kenyon & Kenyon
ATTORNEYS 3,139,520
Patented June 30, 1964

3,139,520

PERFORATED RECORD CARD READING APPARATUS

Teresio Gassino, Ivrea, Italy, assignor to Ing. C. Olivetti & C., S.p.A., Ivrea, Italy, a corporation of Italy Filed Apr. 6, 1962, Ser. No. 185,632
Claims priority, application Italy Apr. 11, 1961
11 Claims. (Cl. 235—61.11)

This invention relates to a perforated record card reading apparatus having a single set of fingers operable for sensing the perforations of a column of a record card, a device operable for feeding said card column by column, and a main operating mechanism for cyclically operating said set and said device. Such an apparatus is useful to transfer the several groups of data recorded in the card to an adding, calculating or accounting machine for being sequentially processed thereby group by group, together or alternately with other data entered by means of the keyboard of the machine.

Record card reading apparatus for statistical machines are generally known, wherein all the columns of the card are read simultaneously, whereby the recorded data cannot be processed group by group by inserting the card in the apparatus a single time.

Other record card reading apparatus are known, wherein the card is read column by column. A first type of these column by column reading apparatus is represented by the verifying apparatus, wherein the columns of the card to be verified are read sequentially in synchronism with the data set-up on a keyboard. To be fed step by step with respect to the set of sensing fingers the card is supported and gripped by a carriage intermittently advanced by an escapement mechanism. However, such a carriage is unable to control the operating mechanism when a card column does not reach exactly the reading station and is further unable to handle cards having variable lengths, for example cards having forty-five, eighty or ninety columns.

Another type of column by column apparatus comprises a normally ineffective set of sensing fingers for each column of the card or tag, the various sets of sensing fingers being sequentially rendered effective by a program control device, whereby no escapement device is required for the card. However, these apparatus are obviously very intricate and expensive to manufacture and, moreover, they cannot handle cards of variable length.

The primary object of the present invention is to provide a perforated record card reading apparatus obviating all the above disadvantages.

Another object of the invention is to provide a perforated record card reading apparatus adapted to intermittently transfer the several groups of recorded data to an adding, calculating or accounting machine for being processed thereby group by group.

Another object of the invention is to provide a step by step card feeding device adapted to exactly locate the card in the reading station before each column is read.

A further object of the invention is to provide a feeding device for cards having variable length, without requiring any manipulation or adjustment by the operator.

Still a further object of the invention is to provide a feeding device adapted to be continuously controlled by the card itself.

According to the invention, in a perforated record card reading apparatus of the type described, I now provide a card feeding device comprising in combination, frictional means for continuously driving said card perpendicularly to its columns, a rack member having a pitch corresponding to the pitch of the columns of said card, an escapement member engageable with said rack member, one of said members being shiftable with respect to the other member for mutual engagement and disengagement, said escapement member being movable for advancement with respect to said rack member and being engageable by the leading edge of said card for being advanced thereby, means operable by said mechanism for cyclically shifting said shiftable member for causing said escapement member to be advanced step by step, and means controlled by one of said members upon said stepwise advancement for conditioning said mechanism.

Other objects, features and advantages of the invention will become apparent from the following description of a preferred embodiment thereof, taken in conjunction with the accompanying drawings, wherein.

The reading apparatus according to the invention is designed to read conventional record cards having a number of columns each one comprising twelve positions of perforation. Such cards usually have either forty-five, or eighty, or ninety columns.

Each card may be perforated according to different groups of data, such as different amounts, each one formed of a plurality of digits from "zero" to "nine" to be transferred to the accounting machine, and according to other data interspersed with said amounts and representing functions to be effected either by the reading apparatus or by the accounting machine. More particularly, the hole "eleven" is adapted to stop the reading apparatus and simultaneously to start a cycle of the accounting machine, whereby it will be perforated in the column of the last digit of each amount. The hole "twelve" may be perforated in the column of the penultimate digit of an amount to predetermine a machine function to be effected in the machine cycle started upon reading the last digit of said amount. For example, such machine function may control a total taking cycle or change the tabulating program of the carriage of the accounting machine.

The combination of holes "eleven" and "twelve" in the same column of a digit is used for error correcting purposes and will prevent the digit recorded in said column from being transferred to the machine, as well the machine cycle from being started. Finally, the combination of holes "two," "three," "eleven" and "twelve," which comprises the preceding combination, is used to control the ejection of the card from the apparatus. Such a combination will be punched in the last column to be read, which will be the column next following the column of the last digit of the last amount to be transferred to the machine. In this case the combination of holes "eleven" and "twelve" will prevent the data read in the column from being transferred to the machine, whereas the combination of holes "two" and "three" will start the machine cycle, as will be hereinafter described.

Figure 1:
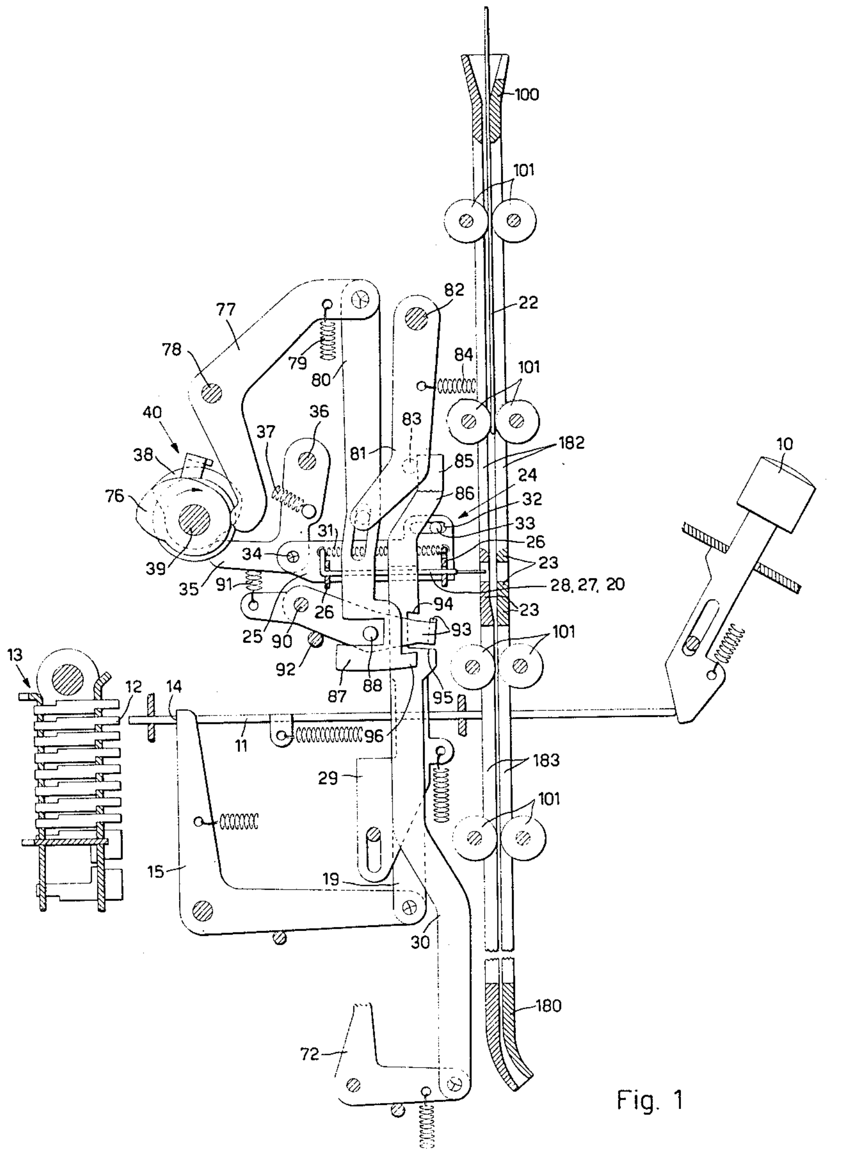
FIG. 1 is a left hand longitudinal partial sectional view of a perforated record card reading apparatus according to the invention, as embodied in a conventional ten-key keyboard accounting machine.

With reference to FIG. 1, the numeral 10 indicates a numeral key of a conventional ten-key keyboard of the accounting machine. Each key 10 is adapted to engage an associated digit entering member or slide 11 for entering the corresponding digit into a set-up mechanism settable order by order and formed of a conventional transversely movable pin carriage 13. More particularly, upon depression of the key 10 the slide 11 is shifted rearwards (leftwards as seen in FIG. 1) to set a pin 12 of the pin carriage 13, which is then transversely advanced one step in a manner known per se.

The perforated card reading apparatus comprises a single set of fingers 20 operable for sensing the holes from "zero" to "nine" of a column of a card 22 at a stationary reading station having a suitably slotted transverse member 23. The sensing fingers 20 are slidably mounted on a pair of transverse comb plates 26 secured to a pair of longitudinal plates 25 (FIGS. 1 and 3) forming therewith a sensing head 24. Each finger 20 is provided with a notch 20' (FIG. 3) engaging a corresponding selectable element in form of a vertical slide 19 adapted to cooperate with a shoulder 14 of the corresponding slide 11 by means of a lever 15 (FIG. 1).

The sensing head 24 carries two additional sensing fingers 27 and 28 (FIG. 3) for the holes "eleven" and "twelve," respectively, of the card column. Two additional selectable elements or vertical slides 29, 30 are slidable on two corresponding notches 27' and 28' of the fingers 27 and 28, respectively. The slide 29 (FIG. 2) is provided with a shoulder 49 adapted to cooperate with a pin 48 of a lever 45 pivoted at 46, whereas the slide 30 (FIG. 1) is connected to a machine function conditioning member formed of a lever 72.

Figures 2, 4:
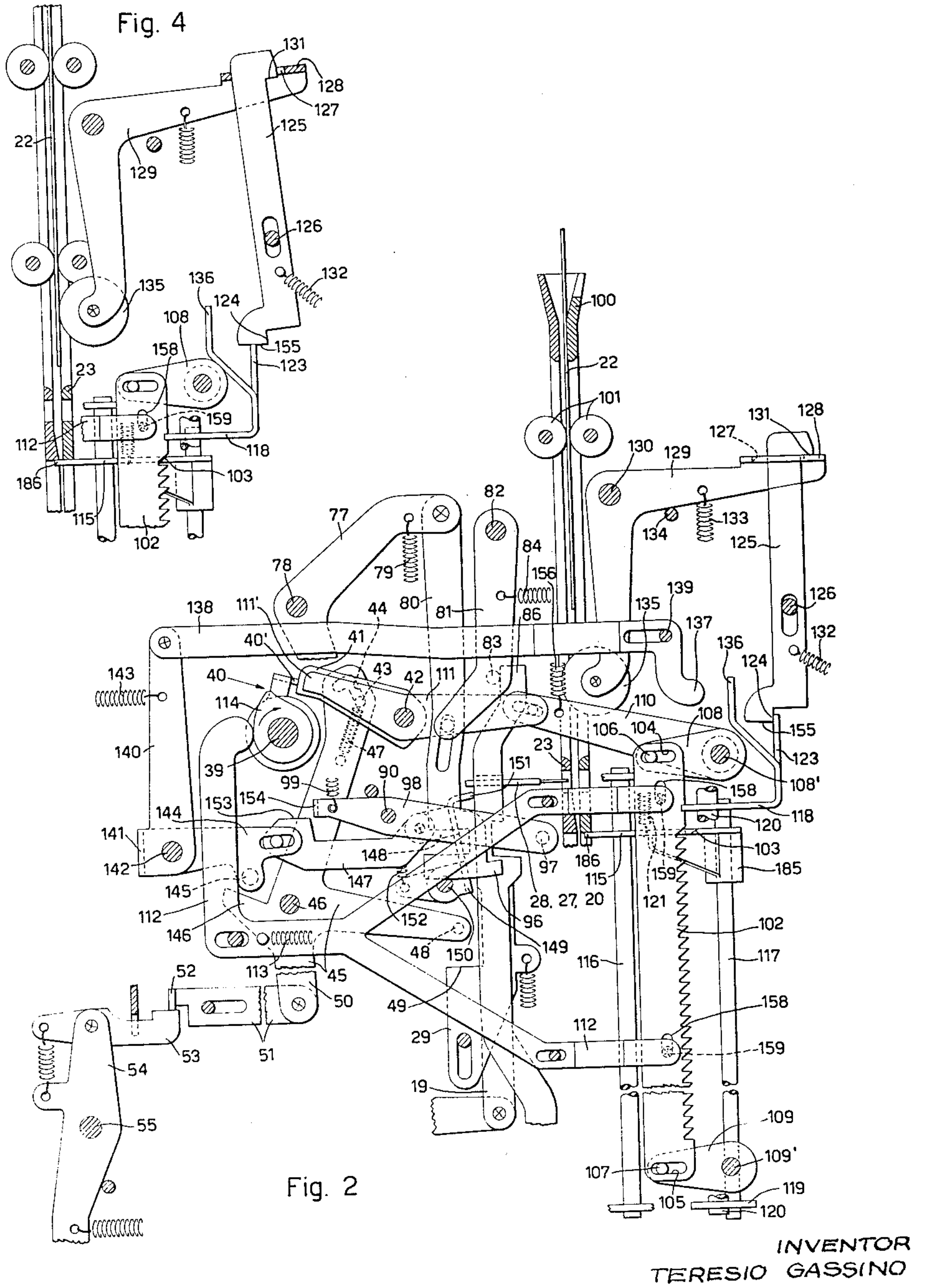
FIG. 2 is a left hand longitudinal partial view of the apparatus of FIG. 1.
FIG. 4 is a detail of FIG. 2 in an operated position.

Each sensing finger 20, 27 and 28 is normally urged by a spring 31 toward the member 23. The right hand plate 25 of the sensing head 24 is provided with a slot 32 sliding on a stationary pin 33 and is connected at 34 to a lever 35 pivoted at 36. The lever 35 is urged by a spring 37 to contact a cam 38 of a main operating mechanism conditionable for cyclically operating the reading apparatus. Said operating mechanism comprises a main shaft 39 adapted to be driven by an electric motor not shown in the drawings through a one cycle clutch generally indicated by the numeral 40 and releasable by a first releasing member 111' and a second releasing member 41 (FIG. 2).

More particularly, the clutch 40 comprises a lug 40' normally contacting the releasing member 41 formed of an arm pivoted at 42 and provided with a pin 43 engaging a cam slot 44 of the lever 45, which is further connected to the pin 43 by a spring 47. A slide 51 pivoted on an arm 50 of the lever 45 cooperates by means of a lug 52 with a pawl 53 fulcrumed on an element operable for starting a machine cycle, said element being known per se and being formed of a lever 54 pivoted on a stationary shaft 55. The releasing member 111' is formed of an arm of a lever 111 pivoted at 42 as well, the arm 111' being shorter than the arm 41.

Figure 3:
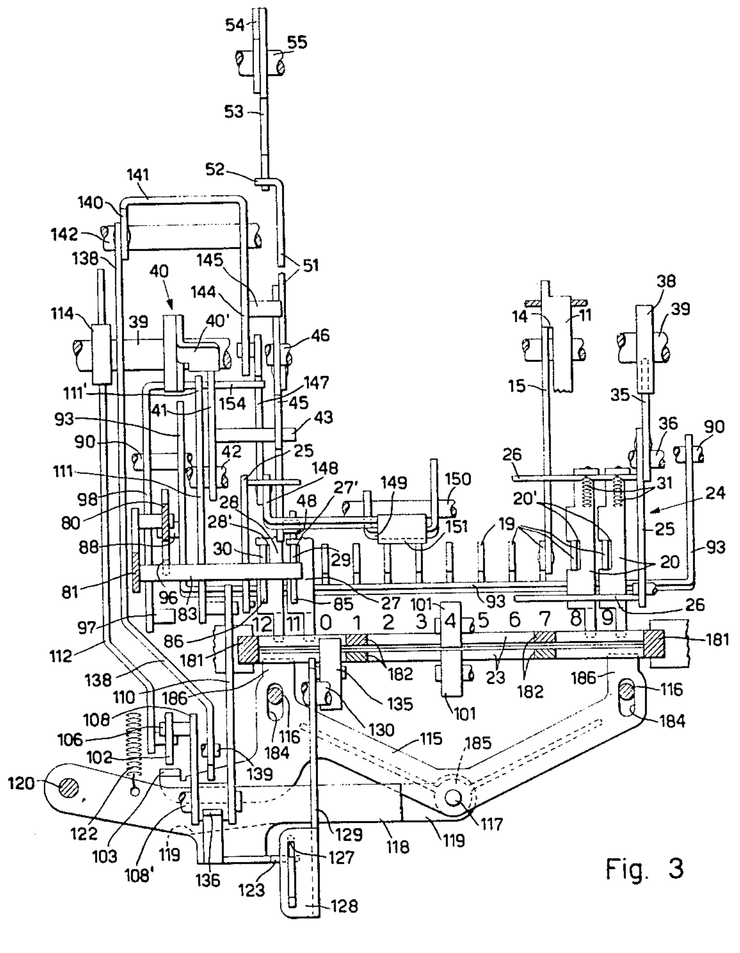
FIG. 3 is a partial plan view of the apparatus of FIGS. 1 and 2.

Secured to the shaft 39 is a second cam 76 (FIG. 1) adapted to operate a lever 77 pivoted at 78 and urged clockwise by a spring 79. Pivoted on the lever 77 is a link 80 pin-and-slot connected to a lever 81 pivoted at 82. The lever 81 is urged by a spring 84 to contact, through a pin 83 secured thereto, two upward projections 85 and 86 formed on the two vertical slides 29 and 30, respectively (FIGS. 1 to 3).

The link 80 is provided with a first projection 87 (FIG. 1) normally engageable with a pin 88 of a universal member or bail 93 pivoted at 90 and urged by a spring 91 to contact a stationary stop member 92. The universal bail 93 is adapted to cooperate with a pair of shoulders 94 and 95 provided on each one of the slides 19, 29 and 30. The link 80 is further provided with a second projection 96 adapted to cooperate with a pin 97 (FIG. 2) of a lever 98 pivoted at 90 and urged clockwise by a spring 99.

The reading apparatus further comprises a device operable for vertically feeding the card 22 column by column past the member 23 (FIG. 1). The feeding device comprises a card guiding structure formed of an upper transverse throat 100 through which the card may be inserted into the apparatus, of the transverse member 23, and of a lower transverse slotted member 180 through which the card will be ejected from the apparatus. The throat 100, the member 23 and the slotted member 180 are interconnected by means of a pair of vertical guide bars 181 (FIG. 3) secured to the machine frame. The throat 100 and the member 23 are interconnected by means of two pairs of rectangular bars 182 (FIGS. 1 and 3), whereas the member 23 and the slotted member 180 are interconnected by means of two further pairs of rectangular bars 183. The bars 181 are adapted to laterally guide the card inserted into the apparatus, whereas the bars 182 and 183 of each pair are separated by a gap adapted to longitudinally guide the card. The gap between the lower bars 183 is very closely equal to the thickness of the card in order to prevent the card to be bent past the member 23.

Furthermore, the card feeding device comprises frictional means continuously driving the card, said means being formed of a set of pairs of friction rollers 101 continuously urged to rotate by the electric motor through suitable gears and a friction joint not shown in the drawings. The rollers 101 of each pair are urged by a spring not shown to contact the card 22 in the central part of the columns thereof, whereby the card is continuously urged to advance downwards perpendicularly to its columns.

The card feeding device further comprises a rack member 102 (FIG. 2) having a pitch corresponding to the pitch of the columns of the card 22, and an escapement member 103 engageable with said rack member, one of said members being shiftable in respect to the other member for mutual engagement, said escapement members being movable perpendicularly to the card columns for advancement with respect to said rack member. More particularly, the escapement member 103 is formed of a projection of a horizontal plate 115 (FIG. 3) provided with two slots 184 engaging two corresponding vertical stationary guide rods 116. Secured to the plate 115 is a hub 185 vertically slidable on a rod 117 carried by a pair of parallel levers 118 and 119 pivoted at 120. The plate 115 normally contacts the lower edge of the member 23 (FIG. 2) by the urge of a spring 121 and is further provided with a pair of projections 186 (FIG. 3) engageable by the extreme portions of the leading or lower edge of the card 22 in order to be advanced thereby.

The lever 118 is urged counterclockwise by a spring 122 and is provided with a bent lug 123 normally so engaged by a shoulder 124 (FIG. 2) of a latch 125 as to hold the projection 103 disengaged from the rack 102 and the projections 186 out of the path of the card 22. The latch 125 is slidably mounted on a stationary pin 126 and in a slot 127 of a lug 128 and is provided with a shoulder 131 normally arrested by the lug 128 against the urge of a spring 132. The lug 128 is bent out from a card sensing means formed of a lever 129 pivoted at 130. The lever 129 is urged by a spring 133 to contact a stationary pin 134 and carries a rubber roller 135 normally located in the path of the card 22.

The rack 102 is adapted to be vertically shifted through a predetermined extent perpendicularly to the columns of the card 22 and is movably mounted parallel to said columns for engaging and disengaging the escapement member 103. More particularly, the rack 102 is provided with a pair of vertical slots 158 engaging a corresponding pair of pins 159 carried by a horizontally movable slide 112 urged by a spring 113 to contact a cam 114 of the main shaft 39. The slots 158 have such a length as to enable the rack 102 to be vertically shifted through an extent substantially equal to the pitch thereof. The rack is further provided with a pair of horizontal slots 104, 105 engaging a corresponding pair of pins 106, 107 carried by two parallel arms 108 and 109 fulcrumed on two pivots 108' and 109', respectively.

Secured to the arm 108 is a lever 110 pin-and-slot connected to the lever 111 and urged clockwise by a spring 156 thus urging the rack 102 upwards to abut against the pins 159 and further urging the arm 111' of the lever 111 into the path of the projection 40'.

The lever 118 is provided with a second bent lug 136 engageable by a projection 137 of a slide 138 slidably mounted on a stationary pin 139 and connected to a first arm 140 of a bail 141 pivoted at 142 and urged counterclockwise by a spring 143. A second arm of the bail 141 is provided with a pin 145 adapted to engage a projection 146 of the lever 45, and is pin-and-slot connected with a link 147 having a shoulder 153 engageable by a lug 154 of the lever 98. The link 147 is connected to a bent lug 148 of a sensing plate 149 pivoted on a stationary shaft 150 and urged by a spring 152 to contact, by means of an edge 151, the vertical slides 19 corresponding to the hole positions "two" and "three" (FIG. 3).

The mode of operation of the card reading apparatus is as follows:

When a card 22 is inserted with its leading edge into the throat 100 to be read column by column, it is gripped by the rollers 101 and urged downwards. The card 22 thus engages the roller 135 and rocks the lever 129 counterclockwise. The lug 128 of the lever 129 moves the latch 125 upwards, whereby the shoulder 124 releases the lug 123 of the lever 118. The spring 122 (FIG. 3) now rocks the lever 118 counterclockwise together with the lever 119 and the rod 117. The plate 115 is thus moved rearwards (upwards as seen in FIG. 3), whereby the projection 103 enters the first upper tooth gap of the rack 102, whereas the projections 186 are moved into the path of the card 22, as shown in FIG. 4. The spring 132 in turn rocks the latch 125 about the stationary pin 126, whereby the shoulder 131 is disengaged from the lug 128 and contacts the left edge of the notch 127. The spring 132 urges now the latch 125 downwards to contact with its edge 155 the lug 123.

When the leading edge of the card 22 engages the projections 186 of the plate 115, this latter is moved downwards against the urge of its spring 121 (FIG. 2). By means of the projection 103 engaging the first upper tooth of the rack 102 the plate 115 shifts the rack 102 downwards against the urge of the spring 156 until arrested by the pins 159 through the upper edge of its slots 158. The rack 102 thus rocks the arms 108 and 109 counterclockwise. The lever 110 is bodily rocked with the arm 108 and will rock the lever 111 clockwise so as to withdraw the arm 111' from the path of the lug 40'.

Since the clutch 40 is still locked by the arm 41, and the card 22 is arrested by the plate 115 which in turn is arrested by the rack 102, the friction joint between the rollers 101 and the motor will slip. This slipping thus enables the card to be exactly located with its first column of perforations in front of the fingers 20, 27 and 28 (FIG. 3), while due to the lateral control of the two projections 186 on the leading edge and to the central urge of the rollers 101 the card is automatically adjusted angularly, irrespective of its length and thus of the reduced lateral guiding effect of the bars 181 on short cards such as of the forty-five columns type.

The lever 45 (FIG. 2) may now be rocked clockwise either manually by means of a suitable manipulative means or under the control of the paper carriage of the accounting machine in a manner known per se. Thereupon the cam slot 44 of the lever 45 rocks the arm 41 clockwise thus releasing the lug 40' of the clutch 40, which will thus drive the main shaft 39 of the reading apparatus through one cycle. The arm 50 of the lever 45 in turn moves the slide 51 rearwards, whereby the lug 52 is engaged by the latch 53.

At the beginning of each cycle of the shaft 39 the cam 38 (FIG. 1) rocks the lever 35 counterclockwise, whereby the reading head 24 is moved towards the card 22 and causes the fingers 20, 27 and 28 to sense the first card column. If a finger 20, 27 or 28 enters a hole it selects the corresponding vertical slide 19, 29 or 30, respectively, which is thus moved forwards and places its shoulder 94 above the universal bail 93. The fingers 20, 27 and 28 which on the contrary are arrested by the card 22, cause the corresponding springs to be tensioned.

In the further course of the cycle the cam 76 of the shaft 39 rocks the lever 77 counterclockwise and moves the link 80 upwards. The projection 87 of the link 80 engages the pin 99 and rocks the universal bail 93 counterclockwise, whereby the selected vertical slides 19, 29 or 30 will be positively raised. If a card column presents a hole in one of the positions "zero" to "nine," the corresponding slide 19 will rock the lever 15 and shift the corresponding slide 11 rearwards, thus setting the corresponding pin 12 and entering the digit read in the card column into the accounting machine.

The cam 76 now releases the lever 77 which is restored by the spring 79 together with the link 80, whereas the selected slides 19, 29 and 30 are returned downwards by their springs. The spring 91 in turn will return the universal bail 93 which engages the shoulder 95 thus assisting the action of the return springs of the slides 19, 29 and 30.

Finally, the cam 114 (FIG. 2) of the shaft 39 temporarily moves the slide 112 rearwards which disengages the rack 102 from the projection 103 of the plate 115. The rack 102 is now returned upwards by the urge of the spring 156 through the stroke allowed by the slots 158 and thereafter is urged forwards by the spring 113 of the slide 112 whereby the projection 103 reengages its next following tooth gap. The escapement member 103 and the plate 115 with the card 22 have thus been advanced one step downwards to place the second card column in front of the sensing fingers.

Due to the upwards return movement of the rack 102 the lever 111 is temporarily returned clockwise and locates the arm 111' into the path of the lug 40' to lock the clutch 40. If the card 22 accidentally does not advance, at the end of the cycle the arm 111' will arrest the shaft 39, whereby it will be clear that the clutch 40 is cyclically controlled by the card. However, due to the continued action of the rollers 101, normally the card 22 will again move downwards together with the rack 102 through the extent allowed by the slots 158 to locate the second card column in front of the sensing fingers, while the rack 102 will rock the lever 111 so as to remove the arm 111' from the path of the lug 40'. At the end of the first cycle the clutch 40 is thus enabled to drive the shaft 39 through a second cycle, whereby the card is read continuously column by column.

If a card column is provided with a hole "twelve" in combination with a hole from "zero" to "nine," the slide 30 (FIG. 1) is raised together with one of the slides 19 by the universal bail 93 and the lever 72 is rocked counterclockwise to predetermine the machine function to be effected in the next cycle of the accounting machine.

If a card column is provided with a hole "eleven" in combination with a hole from "zoro" to "nine," this column represents the last digit of an amount. The slide 29 is now raised together with one of the slides 19 by the universal bail 93 and its shoulder 49 (FIG. 2) engages the pin 48 of the lever 45 which is thus returned counterclockwise to the position shown in FIG. 2.

The lever 45 now moves the arm 41 into the path of the lug 40', whereby at the end of the cycle the shaft 39 of the reading apparatus is stopped. Furthermore, the lever 45 moves the slide 51 forwards and by means of the latch 53 engaging the lug 52 will rock the lever 54 clockwise, thus starting a cycle of the accounting machine. During this machine cycle the card 22 is frictionally held by the rollers 101 in the reached position against the plate 115, which has been moved downwards a number of steps equal to the number of columns read on the card. The next amount recorded in the card may be read by rocking again the lever 45 in the manner above described after the end of the machine cycle.

If the card is provided in a column with the combination of holes "eleven" and "twelve" together with a hole from "zero" to "nine," the two vertical slides 29 and 30 are simultaneously moved forwards. The projections 85 and 86 of the slides 29 and 30, respectively, now release the pin 83, whereby the spring 84 will rock the lever 81 counterclockwise. The lever 81 in turn rocks the link 80 which disengages the projection 87 from the pin 88 of the universal bail 93 and engages its projection 96 with the pin 97 (FIG. 2) of the lever 98. In this case, when the cam 76 (FIG. 1) of the shaft 39 through the lever 77 moves the link 80 upwards, the universal bail 93 is not rocked and does not raise either the slide 19 corresponding to the hole from "zero" to "nine" or the slides 29 and 30, whereby the digit of the card column will not be entered into the machine, the clutch 40 will not be released, the lever 54 will not be opearted and the function control lever 72 will not be operated. On the contrary, the link 80 through the pin 97 now rocks the lever 98 counterclockwise, but in this case no operation will be effected by the lever 98.

Finally, if a card column is provided with the combination of holes "eleven," "twelve," "two" and "three," the vertical slides 19 corresponding to the holes "two" and "three" are moved forwards simultaneously with the slides 29 and 30. Said slides 19 now cause the sensing plate 149 to be rocked clockwise and to move the link 147 forwards, so as to locate the shoulder 153 into the path of the lug 154.

Due to the holes "eleven" and "twelve" the link 80 now rocks the lever 98 instead of the universal bail 93. The lug 154 of the lever 98 engages the shoulder 154 of the link 147 which will rock the bail 141 clockwise. The pin 145 of the bail 141 now engages the projection 146 whereby the lever 45 will be returned counterclockwise and will stop the shaft 39 in the manner above described in connection with the reading of the hole "eleven."

The arm 140 of the bail 141 in turn moves the slide 138 forwards, whereby the projection 134 engages the lug 136 of the lever 118 which is now in the position of FIG. 4. The lug 123 of the lever 118 is now relatched to the shoulder 124 of the latch 125, whereas the plate 115 is moved forwards and disengages the projection 103 from the rack 102 and the two projections 186 from the card 22. This latter is now speedily lowered by the rollers 101 (FIG. 1) until ejected from the slotted member 180, while the plate 115 is returned upwards in the position of FIG. 2 by the spring 121.

It is thus clear that the described reading apparatus is adapted to automatically enter the data of the card into the set-up mechanism of the machine, said data being processed sequentially by the machine together or alternately with other data entered by means of the keyboard, the machine functions being adapted to be conditioned by other data perforated in the card.

It is intended that modifications, improvements and addition of parts may be made in the described reading apparatus without departing from the scope of the invention. For example, the rollers 101 may be positively driven by the electric motor and be adapted to slip on the card when the latter is arrested by the plate 115. Furthermore, the rollers 101 may be replaced by a pair of endless belt frictionally urging the card downwards.

What I claim is:

1. A perforated record card reading apparatus having a single set of fingers operable for sensing the perforations of a column of a record card, a device operable for feeding said card column by column, and a main operating mechanism conditionable for cyclically operating said set and said device, said device comprising in combination:

(a) frictional means for continuously driving said card perpendicularly to its columns, (b) a rack member having a pitch corresponding to the pitch of the columns of said card, (c) an escapement member engageable with said rack member, (d) one of said members being shiftable with respect to the other member for mutual engagement and disengagement, (e) said escapement member being movable for advancement with respect to said rack member and being engageable by the leading edge of said card for being advanced thereby, (f) means operable by said mechanism for cyclically shifting said shiftable member for causing said escapement member to be advanced step by step, (g) and means controlled by one of said members upon said stepwise advancement for conditioning said mechanism.

2. A perforated record card reading apparatus having a single set of fingers operable for sensing the perforations of a column of a record card, a device operable for feeding said card column by column, and a main operating mechanism conditionable for cyclically operating said set and said device, said device comprising in combination:

(a) a set of pairs of friction rollers continuously driving said card perpendicularly to its columns, said pairs of rollers contacting said card substantially in the central part of said columns, (b) a rack member having a pitch corresponding to the pitch of the columns of said card, (c) an escapement member engageable with said rack member, (d) one of said members being shiftable with respect to the other member for mutual engagement and disengagement, (e) said escapement member being movable for advancement with respect to said rack member, (f) a pair of projections on said escapement member adapted to be engaged by the extreme portions of the leading edge of said card for being advanced thereby, (g) and means operable by said mechanism for cyclically shifting said shiftable member for causing said escapement member to be advanced step by step.

3. A perforated record card reading apparatus having a single set of fingers operable for sensing the perforations of a column of a record card, a device operable for feeding said card column by column, and a main operating mechanism conditionable for cyclically operating said set and said device, said device comprising in combination:

(a) a set of pairs of friction rollers continuously driving said card perpendicularly to its columns, said pairs of rollers contacting said card substantially in the central part of said columns, (b) a rack member having a pitch corresponding to the pitch of the columns of said card, (c) an escapement member engageable with said rack member, (d) one of said members being shiftable with respect to the other member for mutual engagement and disengagement, (e) said escapement member being movable for advancement with respect to said rack member, (f) a pair of projections on said escapement member adapted to be engaged by the extreme portions of the leading edge of said card for being advanced thereby, (g) means operable by said mechanism for cyclically shifting said shiftable member for causing said movable member to be advanced step by step, (h) and means controlled by one of said members upon said stepwise advancement for conditioning said mechanism.

4. A perforated record card reading apparatus having a single set of fingers operable for sensing the perforations of a column of a record card, a device operable for feeding said card column by column, a main operating mechanism conditionable for cyclically operating said set and said device, and a one cycle clutch releasable for conditioning said mechanism, said device comprising in combination:

(*a*) frictional means for continuously driving said card perpendicularly to its columns, (*b*) a rack member having a pitch corresponding to the pitch of the columns of said card, (*c*) an escapement member engageable with said rack member, (*d*) means for shiftably mounting said rack member with respect to said escapement member for mutual engagement and disengagement, (*e*) said escapement member being movable for advancement with respect to said rack member and being engageable by the leading edge of said card for being advanced thereby, (*f*) means operable by said mechanism for cyclically shifting said shiftable member for causing said escapement member to be advanced step by step, (*g*) said rack member when engaged by said escapement member being displaceable through a predetermined extent, (*h*) and a releasing member operable by said rack member upon being so displaced for releasing said clutch.

5. A perforated record card reading apparatus having a single set of fingers operable for sensing the perforations of a column of a record card, a device operable for feeding said card column by column, a main operating mechanism conditionable for cyclically operating said set and said device, and a one cycle clutch releasable for conditioning said mechanism, said device comprising in combination:

(*a*) frictional means for continuously driving said card perpendicularly to its columns, (*b*) a rack member having a pitch corresponding to the pitch of the columns of said card, (*c*) an escapement member engageable with said rack member, (*d*) means for shiftably mounting each one of said members with respect to the other member for mutual engagement and disengagement, (*e*) card sensing means for shifting said escapement member to engage said rack member when a card is inserted into said apparatus, (*f*) means for movably mounting said escapement member for advancement with respect to said rack member, said escapement member being engageable by the leading edge of said card for being advanced thereby, (*g*) means operable by said mechanism for cyclically shifting said rack member for causing said escapement member to be advanced step by step.

(*h*) said rack member when engaged by said escapement member being displaceable through a predetermined extent, (*i*) and a releasing member operable by said rack member upon being so displaced for releasing said clutch.

6. A perforated record card reading apparatus having a single set of fingers operable for sensing the perforations of a column of a record card, a device operable for feeding said card column by column, a main operating mechanism conditionable for cyclically operating said set and said device, and a one cycle clutch releasable for conditioning said mechanism, said device comprising in combination:

(*a*) frictional means for continuously driving said card perpendicularly to its columns, (*b*) a rack member having a pitch corresponding to the pitch of the columns of said card, (*c*) an escapement member engageable with said rack member, (*d*) means for shiftably mounting each one of said members with respect to the other member parallel to said columns for mutual engagement and disengagement, (*e*) card sensing means for shifting said escapement member to engage a first tooth of said rack member when a card is inserted into said apparatus, (*f*) means for movably mounting said escapement member perpendicular to said columns for advancement with respect to said rack, said escapement member being engageable by the leading edge of said card for being advanced thereby, (*g*) said rack member when engaged by said escapement member being displaceable from a normal position to an operated position through a predetermined extent perpendicular to said columns, (*h*) means operable by said mechanism for cyclically shifting said rack member so as to be temporarily disengaged from said escapement member, (*i*) said rack member upon being so disengaged being spring urged to return to said normal position and to reengage said escapement member with its next following tooth for causing said escapement member to be advanced one step and said rack member to be displaced to said operated position, (*l*) and a releasing member operable by said rack member upon being so displaced for releasing said clutch.

7. A perforated record card reading apparatus having a single set of fingers operable for sensing the perforations of a column of a record card adapted to be fed column by column, and a main operating mechanism conditionable for cyclically operating said set, said apparatus comprising in combination:

(*a*) frictional means for continuously driving said card perpendicularly to its columns, (*b*) a rack member having a pitch corresponding to the pitch of the columns of said cards, (*c*) an escapement member engageable with said rack member, (*d*) one of said members being shiftable with respect to the other member for mutual engagement and disengagement, (*e*) said escapement member being movable for advancement with respect to said rack member and being engageable by the leading edge of said card for being advanced thereby, (*f*) means operable by said mechanism for cyclically shifting said shiftable member for causing said escapement member to be advanced step by step, (*g*) means controlled by one of said members upon said stepwise advancement for conditioning said mechanism, (*h*) a set of elements adapted to be individually selected for operation by said fingers when sensing a perforation, (*i*) a set of instrumentalities associated with said elements and each one adapted to be engaged by the associated element when operated, (*l*) a universal member normally effective to operate the elements so selected, (*m*) and means controlled by a predetermined combination of said elements when so selected for rendering said universal member ineffective.

8. A perforated record card reading apparatus having a single set of fingers operable for sensing the perforations of a column of a record card adapted to be fed column by column, a main operating mechanism conditionable for cyclically operating said set, and a one cycle clutch releasable for conditioning said mechanism, said apparatus comprising in combination:

(*a*) frictional means for continuously driving said card perpendicularly to its columns, (*b*) a rack member having a pitch corresponding to the pitch of the columns of said card, (*c*) an escapement member engageable with said rack member, (*d*) means for shiftably mounting each one of said members with respect to the other member for mutual engagement and disengagement, (e) an element movable for causing said escapement member to engage said rack member, (f) card sensing means for moving said element when a card is inserted into said apparatus, (g) a latch for latching said movable element upon being so moved, (h) means for movably mounting said escapement member for advancement with respect to said rack member, said escapement member being engageable by the leading edge of said card for being advanced thereby, (i) means operable by said mechanism for cyclically shifting said rack so as to be temporarily disengaged from said escapement member to cause said card to be advanced step by step, (l) said rack member when engaged by said escapement member being displaceable through a predetermined extent perpendicular to said columns, (m) a releasing member operable by said rack member upon being so displaced for releasing said clutch, (n) a set of elements adapted to be individually selected for operation by said fingers when sensing a perforation, (o) a set of instrumentalities associated with said elements and each one adapted to be engaged by the associated selected element when operated, (p) a universal member normally effective to operate the elements so selected, (q) means controlled by a first predetermined combination of said elements when so selected for rendering said universal member ineffective, (r) and means controlled by a second combination of said elements when so selected for causing said latch to unlatch said movable element, said second combination of selected elements comprising the elements of said first combination.

9. In an accounting machine having a ten-key keyboard, and an amount set-up mechanism settable order by order by a set of digit entering members individually engageable by a corresponding key of said keyboard, a perforated record card reading apparatus having a single set of fingers operable for sensing the perforations of a column of a record card adapted to be fed column by column, and a main operating mechanism conditionable for cyclically operating said set, said apparatus comprising in combination:

(a) frictional means for continuously driving said card perpendicularly to its columns, (b) a rack member having a pitch corresponding to the pitch of the columns of said card, (c) an escapement member engageable with said rack member, (d) said escapement member and said rack member being shiftable with respect to each other for mutual engagement and disengagement, (e) said escapement member being movable for advancement with respect to said rack member and being engageable by the leading edge of said card for being advanced thereby, (f) means operable by said mechanism for cyclically shifting said shiftable member for causing said escapement member to be advanced step by step, (g) means controlled by one of said members upon said stepwise advancement for conditioning said mechanism, (h) a set of individually selectable elements operable for engaging said digit entering members, said elements being selected by said fingers when sensing a perforation, (i) and a universal member for operating the elements so selected.

10. In an accounting machine having a ten key keyboard, and an amount set-up mechanism settable order by order by a set of digit entering members individually engageable by a corresponding key of said keyboard, a perforated record card reading apparatus having a single set of fingers operable for sensing the perforations of a column of a record card adapted to be fed column by column, a main operating mechanism conditionable for cyclically operating said set, a one cycle clutch releasable for conditioning said mechanism, and means movable to an effective position for starting said apparatus, said apparatus comprising in combination:

(a) frictional means for continuously driving said card perpendicularly to its columns, (b) a rack member having a pitch corresponding to the pitch of the columns of said card, (c) an escapement member engageable with said rack member, (d) means for shiftably mounting said escapement member and said rack member with respect to each other for mutual engagement and disengagement, (e) card sensing means for shifting said escapement member to engage said rack member when a card is inserted into said apparatus, (f) means for movably mounting said escapement member for advancement with respect to said rack member, said escapement member being engageable by the leading edge of said card for being advanced thereby, (g) means operable by said mechanism for cyclically shifting said rack member so as to be temporarily disengaged from said escapement member to cause said card to be advanced step by step, (h) said rack member when engaged by said escapement member being displaceable through a predetermined extent, (i) a pair of releasing members individually operable for causing said clutch to be released when both said releasing members are operated, one of said releasing members being operated by said rack member upon being so displaced, the other releasing member being operated by said apparatus starting means when moved to said effecting position, (l) a set of individually selectable elements operable for engaging said digit entering members, said elements being selected by said fingers when sensing a perforation, (m) a universal member for operating the elements so selected, (n) an additional selectable element operable by said universal member for restoring said other releasing member and said apparatus starting means, (o) and an additional sensing finger for selecting said additional element when reading a corresponding perforation.

11. In an accounting machine having a ten key keyboard, an amount set-up mechanism settable order by order by a set of digit entering members individually engageable by a corresponding key of said keyboard, and an element operable for starting a machine cycle, a perforated record card reading apparatus having a single set of fingers operable for sensing the perforations of a column of a record card adapted to be fed column by column, a main operating mechanism conditionable for cyclically operating said sensing fingers, a one cycle clutch releasable for conditioning said mechanism, and means movable to an effective position for starting said reading apparatus, said apparatus comprising in combination:

(a) frictional means for continuously driving said card perpendicularly to its columns, (b) a rack member having a pitch corresponding to the pitch of the columns of said card, (c) an escapement member engageable with said rack member, (d) means for shiftably mounting said escapement member and said rock member with respect to each other for mutual engagement and disengagement, (*e*) card sensing means for shifting said escapement member to engage said rack member when a card is inserted into said apparatus, (*f*) means for movably mounting said escapement member for advancement with respect to said rack member, said member being engageable by the leading edge of said card for being advanced thereby, (*g*) means operable by said mechanism for cyclically shifting said rack member so as to be temporarily disengaged from said escapement member to cause said card to be advanced step by step, (*h*) said rack member when engaged by said escapement member being displaceable through a predetermined extent, (*i*) a pair of releasing members individually operable for causing said clutch to be released when both said releasing members are operated, one of said releasing members being operated by said rack member upon being so displaced, the other releasing member being operated by said apparatus starting means when moved to said effective position.

(*l*) a set of individually selectable elements operable for engaging said digit entering members, said elements being selected by said fingers when sensing a perforation, (*m*) a universal member for operating the elements so selected, (*n*) an additional selectable element operable by said universal member for restoring said other releasing member and said apparatus starting means, (*o*) an additional sensing finger for selecting said additional element when reading a corresponding perforation, (*p*) and means engaged by said apparatus starting means when so restored for operating said cycle starting element.

No references cited.